(12) United States Patent
Baker

(10) Patent No.: US 6,650,719 B1
(45) Date of Patent: Nov. 18, 2003

(54) MPEG PCR JITTER, FREQUENCY OFFSET AND DRIFT RATE MEASUREMENTS

(75) Inventor: Daniel G. Baker, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 635 days.

(21) Appl. No.: 09/619,243

(22) Filed: Jul. 19, 2000

(51) Int. Cl.⁷ .......................... H04L 25/00; H04L 25/40; H04L 7/00
(52) U.S. Cl. .......................... 375/371; 370/516; 348/497
(58) Field of Search .......................... 375/354, 359, 375/364, 365, 368, 371; 370/516, 474, 503, 506; 348/497

(56) References Cited

U.S. PATENT DOCUMENTS

| | | |
|---|---|---|
| 5,774,497 A | 6/1998 | Block et al. |
| 5,805,602 A * | 9/1998 | Cloutier et al. ............. 370/516 |
| 5,883,924 A | 3/1999 | Siu et al. |
| 6,072,369 A * | 6/2000 | Dhong et al. ................. 331/17 |

* cited by examiner

Primary Examiner—Jean B. Corrielus
(74) Attorney, Agent, or Firm—Francis I. Gray

(57) ABSTRACT

A method of measuring MPEG PCR jitter, frequency offset and drift rate uses a selectable, constant measurement bandwidth over non-uniform PCR arrival times and a variable PCR rate. The selectable, constant measurement bandwidth is fixed at a frequency that demarcates between jitter and wander. For each received PCR value a PCR interval is determined from the arrival time of the current PCR value and the arrival time of the preceding arrival time. The PCR values, intervals and the fixed bandwidth are input to a set of difference equations, derived either from a hybrid digital-analog PLL model where the frequency offset, drift rate and jitter are extracted from various points in the PLL feedback control system or from a linear filtering approximation to a least mean square (LMS) frequency offset and an LMS drift rate estimator of a simple second order time equation for the PCR values.

3 Claims, 8 Drawing Sheets

MPEG PCR JITTER, FREQUENCY OFFSET AND DRIFT RATE MEASUREMENTS

BACKGROUND OF THE INVENTION

The present invention relates to the quality of compressed video signals, and more particularly to a method for measuring Motion Picture Engineering Group (MPEG) Program Clock Reference (PCR) jitter, frequency offset and drift rate with a selectable, constant measurement bandwidth over non-uniform PCR arrival times and a variable PCR rate.

Recovering a program system timing clock (STC) at a decoder side of a digital transmission system, such as a digital video broadcast (DVB) system, is necessary to recreate a video signal. In the Motion Picture Engineering Group (MPEG) compression scheme to allow isochronous recovery of the STC, explicit Primary Clock Reference (PCR) samples of an encoder's program STC count, such as a 27 MHz clock count, are sent within a Transport Stream (TS). It is required that the PCR values are both (i) correct at the point of origin and (ii) not distorted in the transmission chain to the point of creating problems in the process of decoding the compressed signals. Measuring the interval between arrival times of the PCR values, the accuracy of the expected values, the arrival time and resulting jitter accumulated on the PCR values, and the transmitted arrival time in the TS is necessary to assure the confidence of decodability of the program streams. As jitter, frequency offset and frequency drift rate are important parameters for the overall process, a clear definition is needed for what is understood as PCR jitter and a guidance is needed for its measurement method.

From the specifications set forth in ISO/IEC 13818-1 it is possible to define a limit mask, as shown in FIG. 3, for the frequency deviation from the nominal program STC frequency, 27 MHz. Frequency offset is the difference between the actual value and the nominal frequency of the STC at the encoder. For 27 MHz the limit is set at +/−810 Hz or normalized as +/−30 ppm. Frequency rate of change or drift rate is the "speed" at which the frequency of the program STC varies with time, i.e., it is the first derivative of the frequency with respect to time or the second derivative of phase with respect to time. The limit is set to 75 mHz/sec for the 27 MHz program STC or, normalized to the STC frequency of 27 MHz, as 10 ppm/hr. The phase tolerance is set to +/−500 ns which represents the maximum error of a PCR value with respect to the value it should have due to its time position in the TS.

The limits for frequency offset and drift rate are imposed for the STC as it is represented by the values of the corresponding PCR fields. They include the effects of the program STC and any possible errors in the PCR calculation. The limit of 500 ns is not imposed on the program STC, but on the accuracy representing the PCR values with respect to their position in the TS. However the PCR errors are fully equivalent to phase and jitter errors when the PCR values are used at the decoding point to reconstruct the STC.

A method for testing program STC frequency error, drift rate and PCR jitter is described in ISO/IEC 13818-9, 1996. This test is carried out for one program in the TS at a time. The procedure uses a plot of PCR values, which represent the program STC time at which the data was transmitted, against PCR arrival times, as illustrated in FIG. 1. The arrival times are plotted on the X axis and represent accurate time at the receiver. The PCR values are plotted on the Y axis. A linear regression line is fitted to N samples and the slope of the line minus one is the frequency offset. The jitter is defined as the distance of the PCR values above/below the line.

This method has the problem of determining how large N should be to accumulate enough samples. If N is too large, low frequency timing perturbations, i.e., wander, cause overly large measured values of jitter when using the straight line curve fit rather than a quadratic fit. For the linear fit the slope of this straight line is used to estimate the frequency offset. But since the frequency offset often drifts or wanders, the jitter values may be unduly large due to these wander effects. Since these values far exceed the jitter specification but are tracked by the decoder's phase locked loop (PLL), if the drift rate is below limits they are of no concern. Therefore they should not be in the jitter measurement and should be separately quantified with respect to drift rate. The reverse is also true of the measurement of drift rate—small timing variations that are well within the jitter specification may, and often do, far exceed the drift rate specification since it is proportional to the second derivative of the timing or phase error. Therefore the drift rate measurement should be lowpass filtered to not include timing errors with peak variations within acceptable jitter limits. It is preferred to do a quadratic curve fit also to verify the compliance with frequency drift rate but, if N is too small, timing variations within the jitter limit cause the drift rate estimate to always exceed specification. If the PCRs do not arrive with sufficient regularity, then the regenerated STC may jitter or drift. The receiver/decoder may even go out of lock.

The timing effects visible at a TS interface point may be modeled as indicated in FIG. 2. This is an idealized model of an encoder/remultiplexer and communication network. The components of the model in the encoder are specific to the PCR for a particular program stream, whereas the components in the network relate to the entire TS.

The model has a system clock frequency oscillator with a nominal frequency, F, such as 27 MHz, but whose actual frequency deviates from this by a function, $f_{dev}(p,t)$. This function depends on the time (t) and is specific to a single program stream (p). This represents frequency offset for the nominal frequency which according to the MPEG standard should stay between specified tolerances. Drift rate is the rate of change with time of $f_{dev}(p,t)$. The drift rate also should be below limits set by the MPEG standard.

The system clock frequency oscillator drives a PCR counter which generates an idealized PCR count, $N_{p,i}$, where (p) refers to the specific program stream and (i) refers to the bit position in the TS. To this is added a value from a PCR inaccuracy source, $M_{p,i}$, to create the PCR value seen in the TS, $P_{p,i}$. The simple relationship between these values is:

$$P_{p,i} = N_{p,i} + M_{p,i}$$

At the output of the encoder the TS is being transmitted at a constant bit rate, $R_{nom}$. The communication network beyond the encoder varies the arrival time of MPEG packets from their nominal arrival time by introducing a variable delay, J(i), which is the delay in seconds for the ith bit in the TS. The nominal arrival time is calculated from $R_{nom}$ and the bit index in the TS. The equation for the actual arrival time, A(i), is:

$$A(i) = i/R_{nom} + D + J(i)$$

D is a constant representing the fact that the time origin and bit index origin are arbitrary and that there is a mean delay through the communication network. J(i) represents the jitter in the network delay and its mean value over all time is defined to be zero—this sets the value of D. $J(i)+M_{p,i}$ is the overall PCR jitter which has a maximum error specification set in the MPEG standard.

A constant bandwidth method for determining the frequency offset, drift rate and jitter is preferred so that all measurement systems measure the same values on the same program PCRs at the stated bandwidth. Also a constant bandwidth measurement has more physical meaning in terms of how the recovered STC in the MPEG decoder responds to PCR errors since the decoder typically has a constant bandwidth and operates independently of PCR arrival intervals or PCR average rate.

What is desired is a method of measuring MPEG PCR jitter, frequency offset and drift rate with a selectable, constant measurement bandwidth over non-uniform PCR arrival times and a variable PCR rate.

BRIEF SUMMARY OF THE INVENTION

Accordingly the present invention provides a method of measuring MPEG PCR jitter, frequency offset and drift rate with a selectable, constant measurement bandwidth over non-uniform PCR arrival times and a variable PCR rate. The selected constant bandwidth demarcates jitter from wander and is derived from a limit mask based upon the standards specified for jitter, frequency and drift rate in the MPEG standard. The PCR arrival times are measured with a reference clock and are converted to measured PCR intervals, and the measured PCR intervals, PCR values and selected constant bandwidth are input to a set of difference equations to derive the jitter, frequency and drift rate values. The set of difference equations is derived either from a type II phase locked loop or from least mean square (LMS) linear and quadratic estimators.

The objects, advantages and other novel features of the present invention are apparent from the following detailed description when read in conjunction with the appended claims and attached drawing.

DETAILED DESCRIPTION OF THE INVENTION

Figure 1:
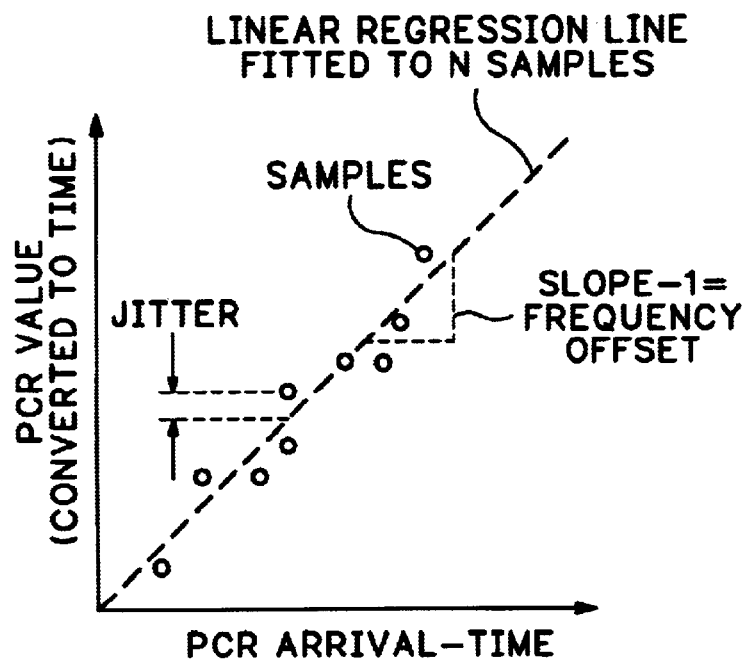
FIG. 1 is a graphical diagram view for estimating frequency offset and jitter according to the prior art.
Figure 2:
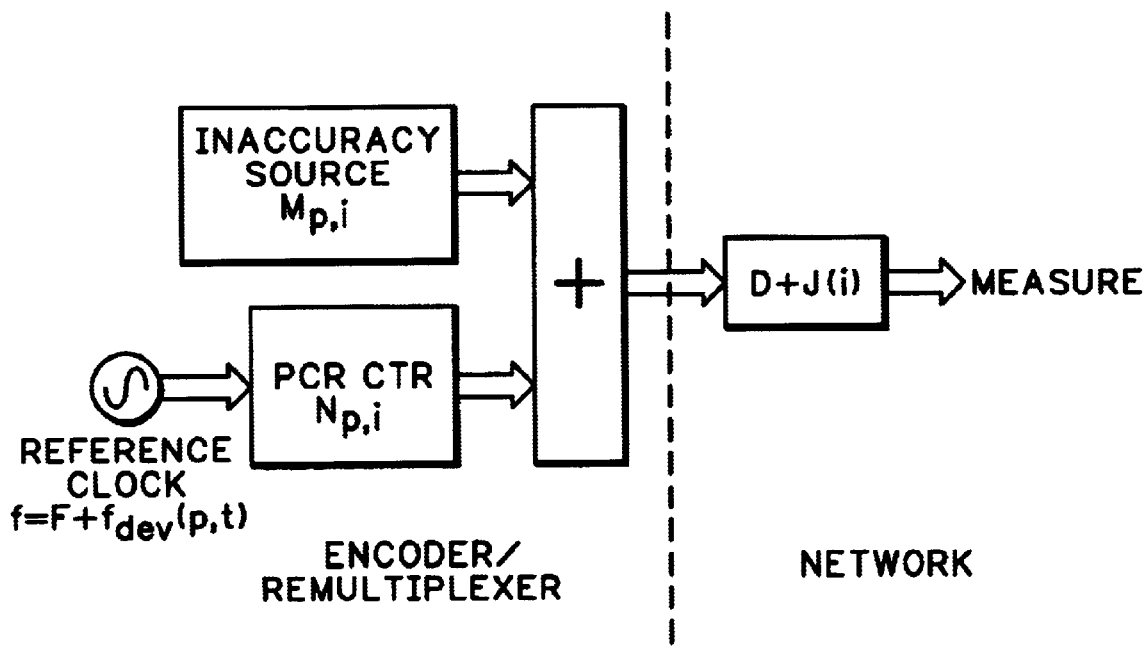
FIG. 2 is block diagram view of a model indicating sources of variation in PCR values for a program stream in an MPEG Transport Stream.
Figure 3:
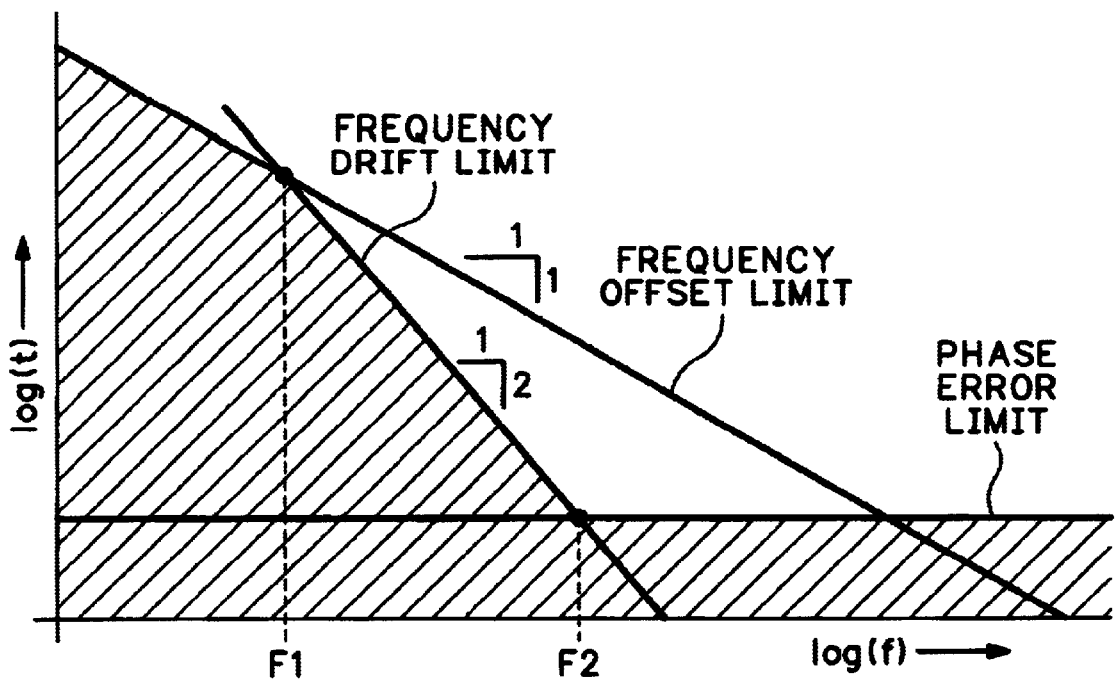
FIG. 3 is a graphical diagram view of a frequency offset drift and jitter mask according to the present invention.
Figure 4:
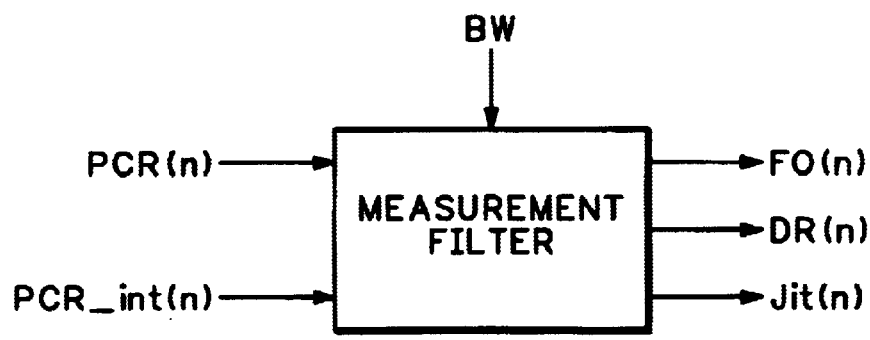
FIG. 4 is a simplified, general diagram view of a measurement filter for measuring frequency offset, dither and jitter according to the present invention.

Two methods are described for measuring frequency offset, frequency drift rate and jitter of an MPEG System Timing Clock (STC) as determined by transmitted PCRs, each method being described as a set of simple difference equations suitable for implementation on a computer. They effect constant bandwidth filters operating on non-uniform sampled data independent of the PCR rate. Each method, as shown in FIG. 4, has two discrete time inputs: (1) the decoded PCR values, PCR(n), for a given program stream from the MPEG Transport Stream (TS); and (2) the PCR intervals, PCR_int(n), between PCR values for the given program stream as measured with an asynchronous precision reference oscillator from the PCR arrival times. Each method has a single control parameter—the measurement bandwidth (BW) which is a demarcation frequency between jitter and wander—that is selectable and constant independently of the average PCR rate. Each method has three discrete time output measurement results: (1) STC frequency offset, FO(n); (2) STC frequency drift rate, DR(n); and (3) PCR jitter, Jit(n).

Figure 5:
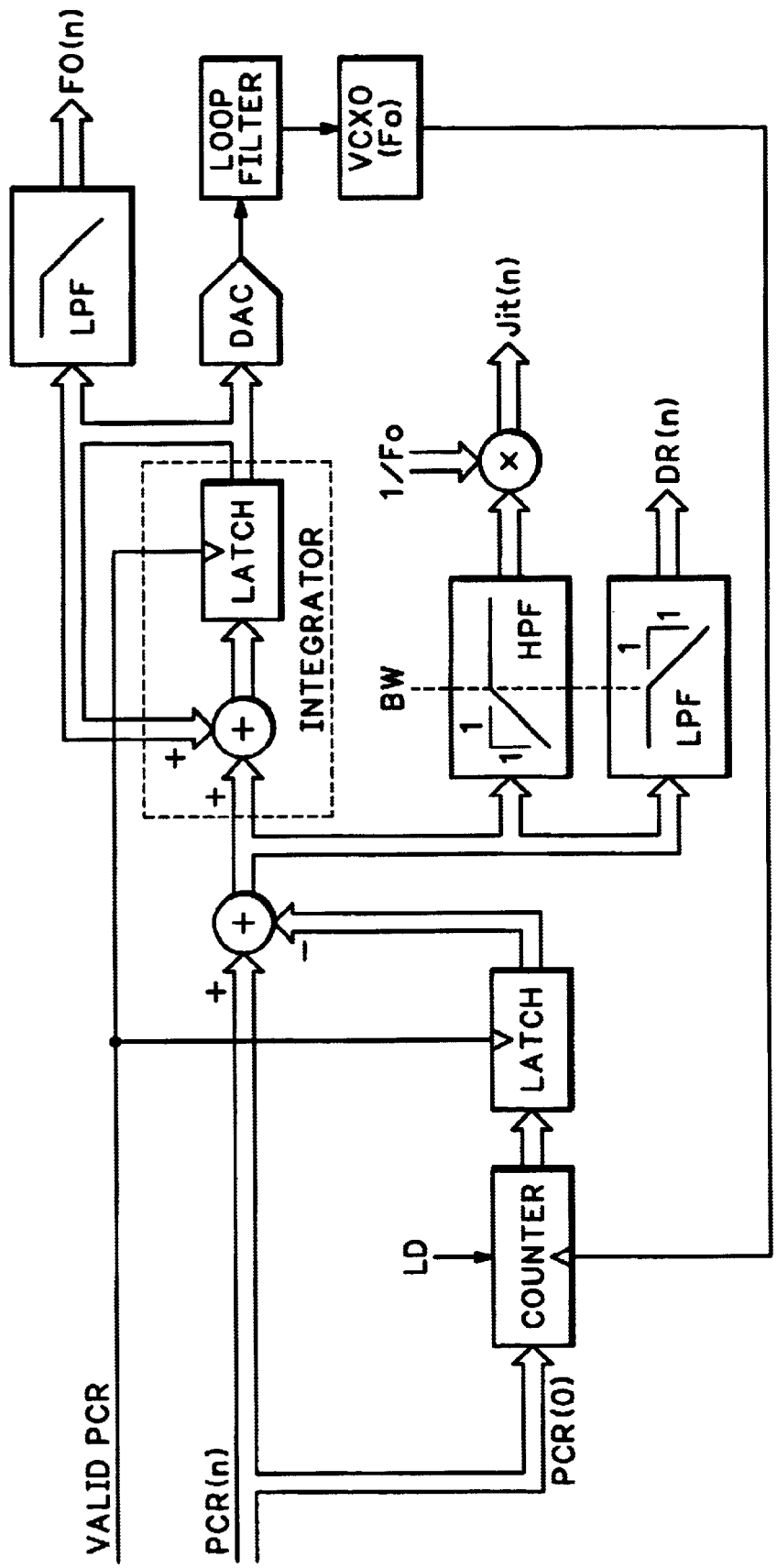
FIG. 5 is a block diagram view of a phase locked loop (PLL) representation for measuring frequency offset, dither and jitter according to the present invention.

The equations for the first method are derived from a hybrid digital-analog phase locked loop (PLL) model, shown in FIG. 5, where the three output parameters are extracted from various points in the resulting feedback control system. Additional high-pass filtering and scaling is added to Jit(n) to improve separation of wander components and scale the output to units of time per second. Additional low-pass filtering is added to FO(n) and DR(n) to improve rejection of jitter components. A practical set of difference equations are derived from the PLL model such that frequency offset, drift rate and jitter may be measured with a selectable, constant bandwidth independently from the non-uniform PCR arrival times.

The type II PLL shown in FIG. 5 has two ideal integrators—a digital accumulator and a voltage controlled oscillator. This creates a second order highpass closed loop response at the output of the phase subtraction. Therefore below the loop bandwidth the response is proportional to drift rate and above the loop bandwidth the response is proportional to jitter. A first order highpass filter is added to the jitter measurement to remove the effects of drift rate. Conversely a lowpass filter is added at the drift rate output to remove the effects of jitter from that measurement. The filters are best implemented using digital signal processing (DSP) on the raw data and, since the PCR rate is the sample rate, the average PCR rate is determined and the coefficients adjusted to maintain approximately the correct measurement filter bandwidths and control loop damping. It is possible to convert the PLL to a fully sampled system driven by a measured PCR interval using a free running oscillator and the decoded PCR values such that the bandwidth is independent of non-uniform PCR rate and the measurement values are computed in software without an explicit voltage controlled oscillator.

The VCXO may be constructed from a subsystem having a free-running OCXO of 0.1 ppm accuracy and a FLL locking a VCXO with +/−30 ppm range. This may be used to calibrate the frequency offset output to 0.1 ppm accuracy if desired. Otherwise the VCXO may be used alone and it's frequency error or offset verified by applying a known, accurate frequency, and subtracting the error from subsequent measurements. This describes a PLL implementation as a hybrid DSP and analog signal processing method.

Figure 6A:
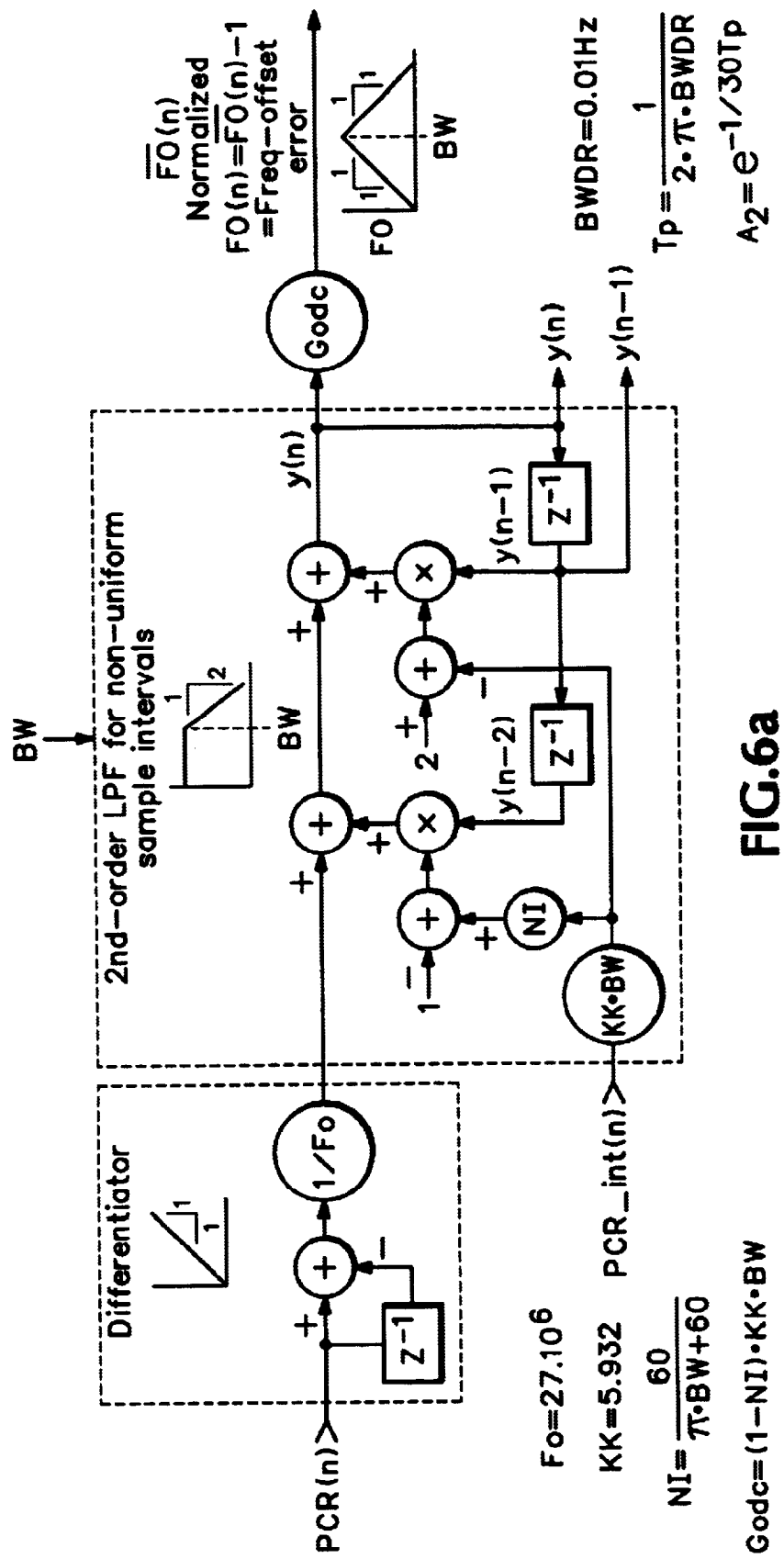
FIG. 6 is a block diagram view of an equivalent circuit to that of FIG. 5 for deriving a set of difference equations according to the present invention.
Figure 6B:
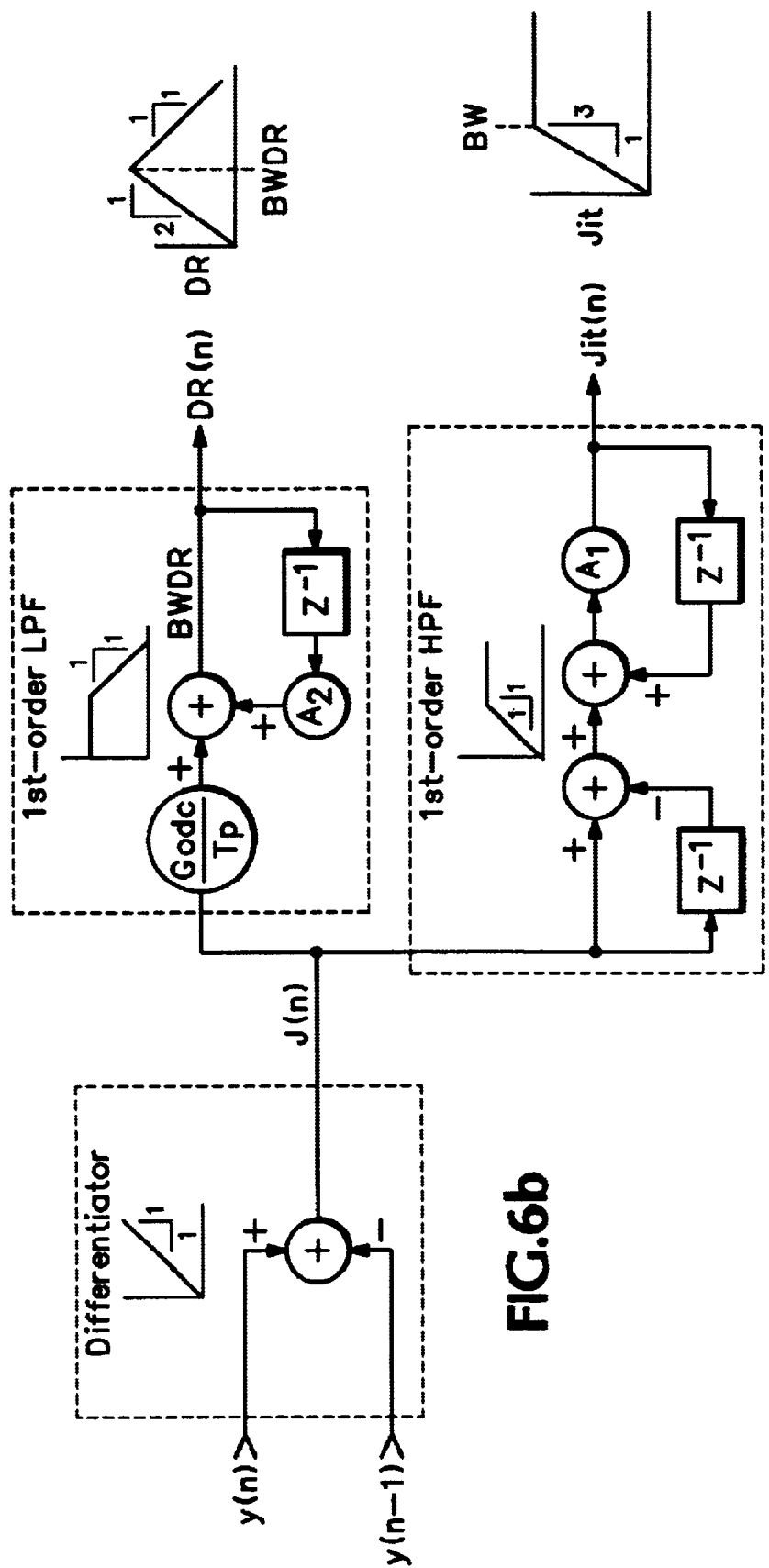

A practical set of difference equations may be derived from the PLL model duplicating the closed-loop response such that frequency offset, drift rate and jitter may be measured with a selectable, fixed bandwidth independently of the non-uniform PCR arrival times. Such an equivalent circuit is shown in FIG. 6 for deriving such equations. The PCR(n) values are input to a differentiator, and the output from the differentiator is input to a second order lowpass filter for non-uniform sample intervals. Also input to the second order lowpass filter is the corresponding PCR_int(n) from the last received PCR(n−1). The filter output y(n) is multiplied by the overall open loop d.c. gain, Godc, to obtain a normalized frequency from which unity is subtracted to derive the bi-polar frequency offset FO. The filter outputs for two consecutive samples, y(n) and y(n−1), are input to a second differentiator to produce a jitter error output, J(n), which is in turn input to both a first order lowpass filter to derive the drift rate, DR(n), and a first order highpass filter to derive the jitter, Jit(n). From this illustrated circuit the difference equations may be derived:

$$y(n)=2*y(n-1)-y(n-2)-(y(n-1)-N1*y(n-2))*5.932*BW*PCR\_int(n)+(PCR(n)-PCR(n-1))/Fo$$

where Fo is 27 MHz, BW is the measurement bandwidth in Hertz and N1 is a constant equal to $1/(1+pi*BW/60)$. From y(n) frequency offset, FO(n), is $y(n)*Godc-1$ where Godc is a constant equal to $(1-N1)*5.932*BW$. Jitter, Jit(n), becomes $Jit(n)=A1*(Jit(n-1)+J(n)-J(n-1))$ where $J(n)=y(n)-y(n-1)$ and A1 is $exp(-2*pi*BW*0.68/30)$. Finally drift rate, DR(n), is $A2*DR(n-1)+(Godc/Tp)*J(n)$ where Tp is $1/(2*pi*0.01)$ and A2 is $exp(-1/30*Tp)$. In this way DR(n) is post-filtered with a fixed bandwidth of 0.01 Hz and y(n) is initialized to 1/Godc to minimize settling time.

The second method is derived from a linear filtering approximation to a least mean square (LMS) frequency offset estimator (linear-term coefficient) and LMS drift rate estimator (quadratic-term coefficient) of a simple second order time equation for the PCR values. The resulting difference equations yield results similar to those in the method described above, but are a little simpler to compute.

Given PCR_AT(n) as the measured arrival time of each of the received PCR(n) values using an accurate reference clock, the following equation defines the expected PCR(n) values with terms for the program decoder STC frequency offset, drift rate and jitter:

$$PCR(n)=a+PCR\_AT(n)*Fstc+(PCR\_AT(n))^2*c+\epsilon(PCR\_AT(n))$$

cycles of Fstc. The last term is the jitter as a function of time. PCR_AT(n) is a random variable added to PCR(n) due to the combined effects of arrival time jitter and PCR(n) encoding error. It is assumed to be a zero-mean, Independent, Identically Distributed random variable, which is fairly realistic. Therefore the PCR(n) values are themselves I.I.D. random variables. a is an initial phase error relative to the reference oscillator, Fstc is the system timing clock frequency and c is one-half the drift rate since drift rate (Hz/s) is a second time derivative of phase, DR=2*c. The known ideal system clock frequency, Fo=27 MHz, is subtracted to find the STC frequency offset and the terms are normalized by dividing by Fo. Since the STC drift rate is typically very small relative to the allowable frequency offset values and is preferred to be included within the frequency offset measurement, the equation may be simplified for analysis of frequency offset, b, without the drift rate term, c. The drift rate and higher order derivatives affect the frequency offset value rather than defining frequency offset with higher order components removed.

$$PCR\_err(n)=a+PCR\_AT(n)*b+\epsilon(PCR\_AT(n)) \text{ seconds}$$

where $b=(Fstc-Fo)/Fo$. The jitter term now is in seconds of jitter and a is the initial phase offset in seconds and b is the frequency offset of the STC as a dimensionless ratio. This equation, neglecting drift rate, is the equation for PCR(n)s allowing a linear regression or straight line fit of the data to be determined from estimates of the coefficients a and b to minimize the mean square error due to jitter. This provides the dual result of first determining STC frequency offset FO as the LMS estimate for b, and second the jitter by subtracting the FO effect due to b and the initial phase value a as suggested by the MPEG standard.

In order to determine the number of PCR(n) values with which to compute the straight line fit, a comparison of the linear regression analysis to a linear filtering process is necessary. This way the effective bandwidth of the averaging of the linear fit to the PCR(n) data may be found for an average PCR rate where the PCR(n) values are temporarily assumed to arrive at a uniform average rate. This uniform rate assumption is justified in this context due to the large number of samples that are used in order to properly estimate FO within the constraints imposed by the very small drift rate tolerance of the MPEG standard, 10 ppm/Hr. Once a good approximation of a filter response to the straight line fit regression analysis is determined, a constant bandwidth filtering process may be constructed for non-uniform sampled data that is itself a function of the instantaneous sample interval in order to develop a constant bandwidth measurement that is independent of PCR rate. This is important since it allows a continuously updated filtering process to be mechanized to find practical and consistent estimates of the PCR jitter, STC frequency offset and drift rate for comparison to the published limits of the MPEG standard. Further since the bandwidth of the measurement is constant, a standardized demarcation frequency based on the STC drift rate and PCR accuracy specifications may be used to determine a practical and standardized filter bandwidth that has a direct relationship to the recovered STC clock characteristics in the MPEG decoder.

Linear Regression Analysis:

Let TO be the average PCR_interval determined by the reference clock and assume uniform arrival times spaced TO seconds apart.

$$PCR\_err(n)=a+b*TO*n+\epsilon(n*TO) \text{ seconds}$$

Given N samples of PCR values, least mean square (LMS) estimates of a and b are given by vector B:

$$B=[a;b]; \; B=T^{-1}*(N*N^T)^{-1}*(N^T*X)$$

where $$T^{-1}=[1,0; \; 0, TO^{-1}]; \; (N*N^T)^{-1}=[2(2N+1),-6; \; -6, 12/(N+1)]*(1/(N(N-1)))$$

$$(N^T*X):=[\Sigma_{n=1\to N}PCR\_err(n); \; \Sigma_{n=1\to N}PCR\_err(n)*n].$$

Initial phase is determined below:

$$a=2/(N*(N-1)*TO)\{\Sigma_{n=1\to N}PCR\_err(n)*(2N+1-3n)\}.$$

Frequency offset estimate for N uniformly spaced samples:

$$b=6/(N*(N-1)*TO)\{\Sigma_{n=1\to N}PCR\_err(n)*(2n/(N+1)-1)\}.$$

Figure 8A:
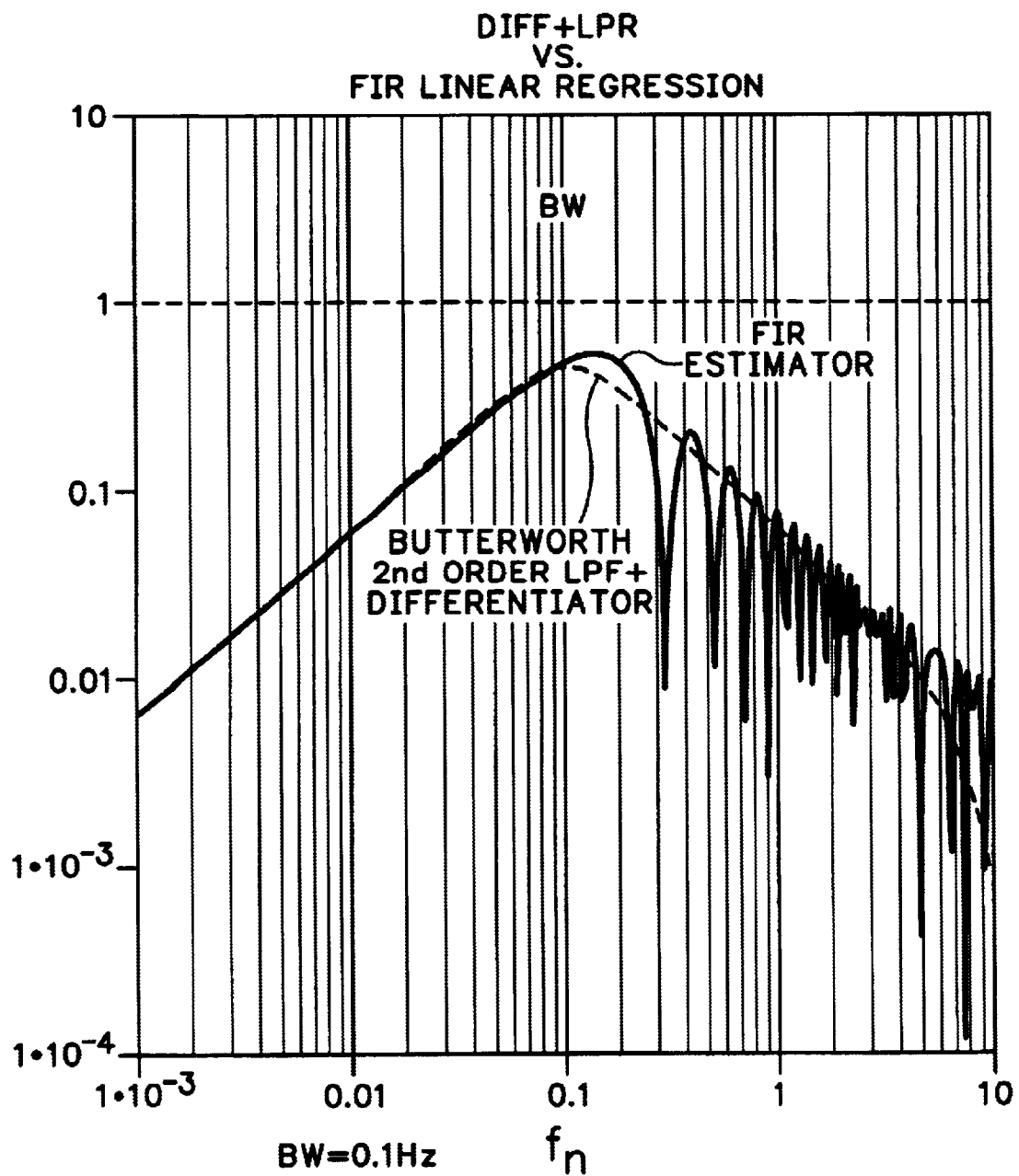
FIGS. 8a and 8b are comparisons of FIR linear and quadratic regression filters with a differentiator plus lowpass filter and dual differentiators plus lowpass filters respectively according to the present invention.
Figure 8B:
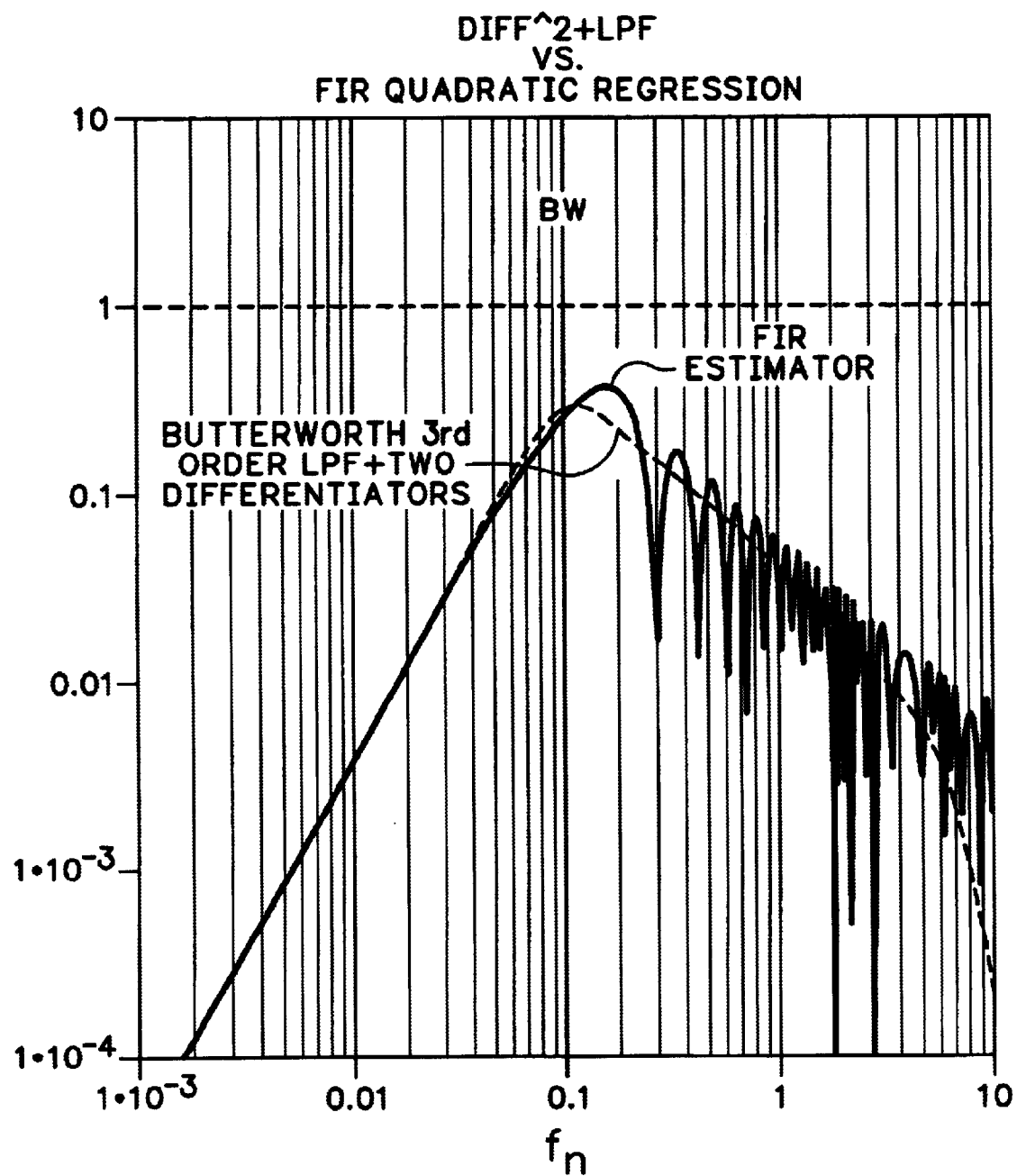

Quadratic Regression Analysis:

Without neglecting the STC frequency drift rate find an LMS quadratic curve fit and estimate of the coefficient c, where c=(STC frequency drift rate)/2=DR/2:

$PCR\_err(n) = a + b*TO*n + c*TO^2*n^2 + \epsilon(n*TO)$ seconds $B = [a;b;c] = T^{-1}(N*N^T)^{-1}(N^T*X);\ T^{-1} = [1,0,0;\ 0,TO^{-1},0;\ 0,0,TO^{-2}];$ $(N*N^T)^{-1} = [3(3(N+1)+2), -18(2N+1), 30;$ $-18(2N+1), \{12(2N+1)(8N+11)\}/\{(N+1)(N+2)\}, -180/(N+2);$ $30, -180/(N+2),\ 180/\{(N+1)(N+2)\}]/\{N(N-1)(N-2)\};$ $(N^T*X) = [\Sigma_{n-1 \to N} PCR\_err(n);\ \Sigma_{n-1 \to N} PCR\_err(n)*n;\ \Sigma_{n-1 \to N} PCR\_err(n)*n^2].$ Then LMS estimate for frequency drift rate for N uniformly spaced samples is:

$DR = 60/\{N(N-1)(N-2)TO^2\} \Sigma n=1 \to N PCR\_err(n)\{6n^2/\{(N+1)(N+2)\} - 6n/(N+2)+1\}.$ These two LMS estimators, frequency offset from linear regression and frequency drift rate from quadratic regression, may be implemented as finite impulse response (FIR) filters. First describing the LMS estimate of the frequency offset in terms of a FIR filter as a function of z and the number of PCR values averaged, N:

$Hr(z,N) = 6/\{N(N-1)TO\} * z^{-N} * \Sigma_{k=0 \to (N-1)} z^k \{2(k+1)/(N+1)-1\}.$ The number of samples used to estimate FO is N=Pr/(2*BW) where Pr is an average PCR rate, TO is 1/Fs and BW is the measurement bandwidth. Therefore as an example N=floor(Pr/(2*BW))=125 samples with Pr=24 and BW=0.1 Hz. Second describing a FIR filter as a function of z the frequency drift rate estimate is:

$Hdr(z,N) = \{60/(N(N-1)(N-2)TO^2)\} z^{-N} \Sigma_{k=0 \to N-1} \{(6(k+1)^2)/((N+1)(N+2))(6(k+1))/(N+2)+1\}$ For comparison a second order recursive Butterworth lowpass filter of bandwidth BW is cascaded with a differentiator. A cascade of the recursive LPF and the differentiator response is compared to the FIR LMS frequency offset estimator in FIG. 8a. Drift rate FIR response is shown in FIG. 8b where:

$N = floor(Pr/(2^{1/2}*Bw)) =$ number of samples processed by the FIR filter at the average PCR rate of Pr. For comparison a $3^{rd}$ order recursive Butterworth LPF of bandwidth BW cascaded with two differentiators is compared to the FIR LMS drift rate estimator in FIG. 8b.

From this analysis there is a close approximation of linear and quadratic regression of uniformly sampled data to two linear, recursive filtering processes cascaded with simple differentiators. Given an estimate of the average PCR rate, Pr, the bandwidth, BW, of the equivalent recursive filter process to replace a linear regression analysis of N samples is BW=Pr/(2*N) and for quadratic regression BW=Pr/($2^{1/2}$*N). These equivalent processes may be constructed from difference equations for differentiators and Butterworth LPF filters as shown above. Since the equivalent recursive filters only require storage of two previous PCR values and relatively minor multiply/adds, they are much easier to compute and may be done concurrently for many program PCRs with a single processor yielding a constant bandwidth measurement result. The PCR jitter may be determined by subtracting the estimated PCR values due to frequency offset by using the estimated value from the filtering process and applying a HPF to reject the drift rate components from the result.

Figure 7:
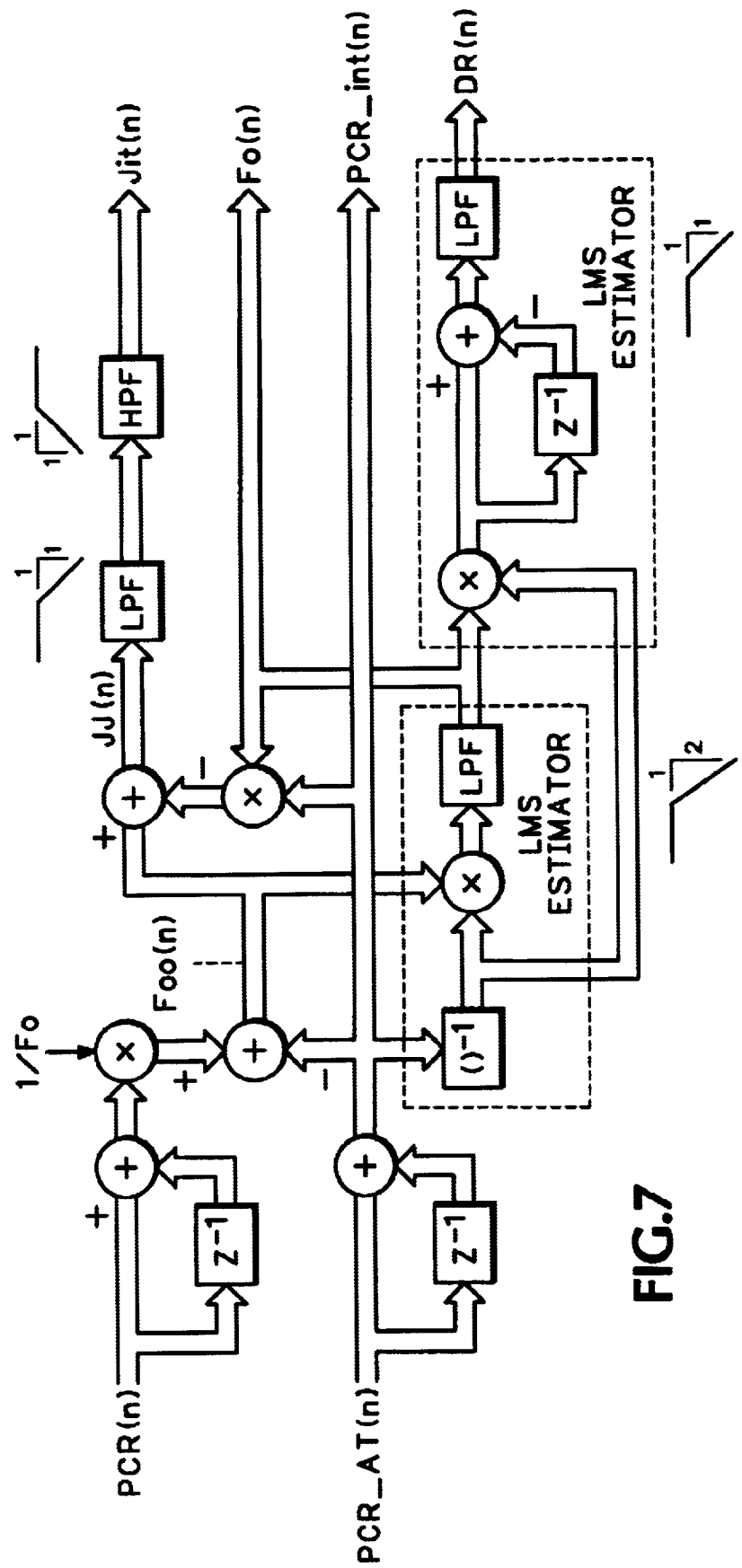
FIG. 7 is a block diagram view of an equivalent circuit using least mean square first and second order estimators for deriving a set of difference equations according to the present invention.

An equivalent circuit for this second method is shown in FIG. 7. The PCR_int(n) is derived from the PCR_AT(n) times and subtracted from the differentiation of the PCR(n) values, normalized, to produce a PCR(n) error value, Foo(n). Foo(n) is input to a first linear LMS estimator which includes a derivative function and a second order lowpass filter to produce the frequency offset, FO(n). The frequency offset is input to a second quadratic LMS estimator which includes a derivative function, differentiator and first order lowpass filter to produce the drift rate, DR(n). The frequency offset also is multiplied by the PCR_int(n) and the result subtracted from the PCR(n) error value to produce an instantaneous jitter value, JJ(n). The instantaneous jitter value is then processed by a cascade filter, having first a first order lowpass filter followed by a first order highpass filter, that produces the PCR jitter, Jit(n). The resulting difference equations are:

$FO(n) = PCR\_int(n)*(\Pi*BW)^2*Foo(n)*E(n) + 2E(n)*FO(n-1) - E(n)^2*FO(n-2)$ where $Foo(n) = [PCR(n) - PCR(n-1)]/Fo - PCR\_int(n);$ $E(n) = \exp[-PCR\_int(n)*\Pi*BW]\ (\exp(-x) \sim 1 - x + x^2/2 - x^3/3);$ $DR(n) = E(n)*DR(n-1) + \Pi*BW*[FO(n) - FO(n-1)];$ $JJ(n) = Foo(n) - FO(n)*PCR\_int(n);$ $Jit(n) = E(n)*[JJ(n) - JJ(n-1) + 2*Jit(n-1) - E(n)*Jit(n-2)].$ Thus the present invention provides a method of determining MPEG PCR jitter, frequency offset and drift rate from the PCR values arriving at non-uniform intervals and a selectable, constant bandwidth which is the frequency that separates wander from jitter using a set of difference equations derived either from a type II phase locked loop or from LMS first and second order estimators.

What is claimed is:

1. A method of measuring program clock reference (PCR) jitter, frequency offset and drift rate with a selectable constant measurement bandwidth over non-uniform PCR arrival times and a variable PCR rate comprising the steps of:

measuring an interval between PCR arrival times with an asynchronous precision reference oscillator;

fixing the selectable constant measurement bandwidth independently of the variable PCR rate, the fixed selectable constant measurement bandwidth demarcating a frequency between jitter and wander; and calculating the PCR jitter, frequency offset and drift rate as a function of the interval between PCR arrival times, the PCR values at each PCR arrival time and the fixed selectable constant measurement bandwidth in the form of a set of difference equations.

2. The method as recited in claim 1 wherein the set of difference equations is derived from a hybrid digital-analog phase locked loop (PLL) model where the jitter, frequency offset and drift rate are extracted from various points in a feedback control system for the PLL.

3. The method as recited in claim 1 wherein the set of difference equations is derived from a linear filtering approximation to a least mean square (LMS) frequency offset and an LMS drift rate estimator of a simple second order time equation for the PCR values.

* * * * *